Oct. 7, 1958
P. F. SALTZMAN
2,855,129
SEED PLANTER
Filed May 8, 1957
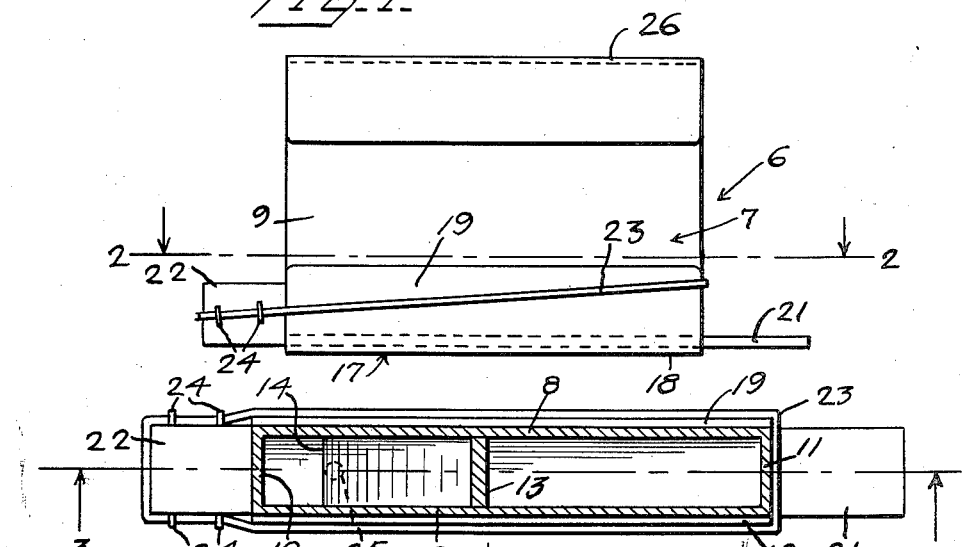
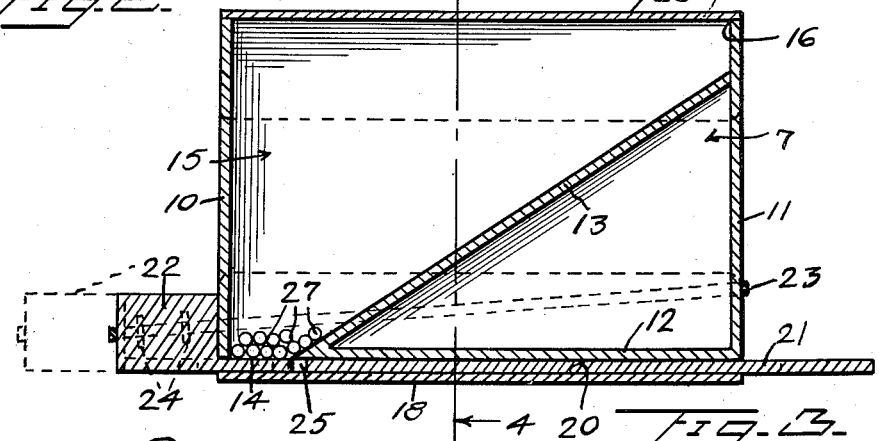
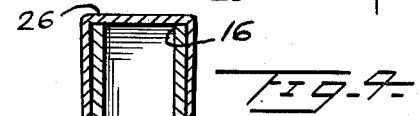
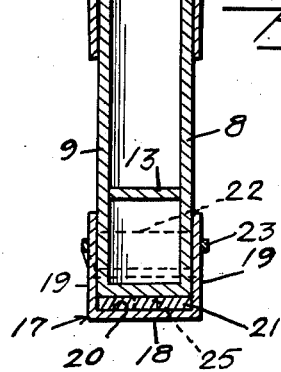
INVENTOR
P. F. Saltzman
BY John N. Randolph
ATTORNEY

2,855,129

SEED PLANTER

Peter F. Saltzman, South Sioux City, Nebr.

Application May 8, 1957, Serial No. 657,828

3 Claims. (Cl. 222—361)

This invention relates to a novel seed planter of extremely simple construction which is adapted to be conveniently held in one hand and including valve means adapted to be manipulated by the thumb or a finger of the hand which supports the planter for dispensing seeds therefrom in a desired measured amount.

More particularly, it is an object of the present invention to provide a portable planter which may be conveniently utilized for accurately planting seeds to avoid waste of seeds and to enable the seeds to be properly spaced.

Various other objects and advantages of the invention will hereinafter become more fully apparent from the following description of the drawing, illustrating a presently preferred embodiment thereof, and wherein:

Figure 1 is a side elevational view of the seed planter;

Figure 2 is an enlarged horizontal sectional view thereof, taken substantially along a plane as indicated by the line 2—2 of Figure 1;

Figure 3 is a longitudinal vertical sectional view of the seed planter, taken substantially along a plane as indicated by the line 3—3 of Figure 2, and Figure 4 is a transverse sectional view, taken substantially along a plane as indicated by the line 4—4 of Figure 3.

Referring more specifically to the drawing, the seed planter in its entirety is designated generally 6 and includes a box-like body portion, designated generally 7, comprising spaced substantially parallel side walls 8 and 9, end walls 10 and 11, a bottom 12 and an inclined partition wall 13. The bottom 12 extends between the side walls 8 and 9 and from the end wall 11 to a point spaced from the end wall 10. The inclined partition wall 13 also extends between the side walls 8 and 9 and has one end merging with the end wall 11, near the open top of the body member 7, and an opposite lower end merging with the end of the bottom 12, which is located adjacent the end wall 10. Said lower end of the partition 13 and the end of the bottom 12, which merges therewith, combine with the lower end of the end wall 10 and portions of the side walls 8 and 9 to provide a restricted outlet opening 14. The portion of the body member 7 disposed above the inclined partition 13 constitutes the hopper 15 of the planter 6. The open top 16 of the body member 7 constitutes the open top of the hopper 15.

The planter 6 includes a bottom channel member 17 of a length corresponding to the length of the body member 7 and which includes a substantially flat bottom 18 and spaced substantially parallel side walls 19 which are spaced apart a distance to snugly embrace lower portions of the side walls 8 and 9 of the body member 7, as seen in Figures 2 and 4, for detachably supporting the bottom channel member on the bottom portion of the body member 7 and with the channel bottom 18 disposed beneath and spaced from the bottom 12 to combine therewith and with portions of the side walls 19 to form a passage 20 which extends from end-to-end of the body member 7 and which has open ends and is of a width corresponding to the width of the body member 7.

An elongated bar 21 is of a cross sectional size to slidably fit relatively snug in the passage 20, as seen in Figure 4, and is of a length substantially greater than the length of the body member 7. The bar 21 has an upstanding enlargement or block 22 at one end thereof, the inner end of which abuts against the lower portion of the outer side of the end wall 10, in a normal retracted position of the bar 21. An endless elastic band 23, such as a rubber band, has a portion thereof looped around the opposite outer end of the block 22 and is preferably suitably anchored thereto as by small staples 24 which are driven into the sides of the block 22 for clamping parts of the elastic band 23 to the sides of the block. The remainder of the elastic band 23 is stretched around the body member 7 and has portions extending along the outer sides of the walls 19 and across the end wall 11 for yieldably retaining the bar 21 and block 22 in retracted positions with the block 22 bearing against the end wall 10. The bar 21 is provided with at least one seed receiving opening 25 which is disposed beneath and closed by the bottom 12, when the block 22 is in engagement with the wall 10, as seen in Figures 2 and 3. When the block 22 is thus disposed, the end of the bar 21, located remote therefrom, protrudes beyond the end wall 11 a distance greater than the spacing between the block 22 and opening 25. It will thus be seen that the bar 21 with the opening 25 and block 22 forms a reciprocating valve of the planter 6.

The open top 16 of the body member 7 and hopper 15 is closed by a channel shape closure 26, corresponding to the channel member 17 and which is mounted in an inverted position on the top of the body member 7 and which may be removed therefrom or slidably moved endwise from the closed position of the cover, as seen in Figure 1, to expose all or a portion of the top opening 16 so that the hopper 15 can be filled or partially filled with seeds 27, after which the cover 26 is returned to a closed position.

The partition 13 forms an inclined bottom of the hopper 15 which deflects the seeds 27 toward the hopper outlet opening 14 which is normally closed by a portion of the bar 21, as seen in Figure 3. The planter 6 is shown in the drawing on an enlarged scale relative to its actual size and, while capable of being made in various sizes, will normally be of a size approximately equal to or smaller than a small match box so that it can be conveniently held in one hand with the thumb or one finger of the hand disposed against the end of the bar which protrudes from the end wall 11. The planter 6 as thus held, with the bottom channel member 17 in a lowermost position, is placed over a position where a seed or seeds 27 is to be dropped and pressure is exerted against said bar end to move the bar 21 and block 22 from right to left as seen in Figures 1 to 3. As the opening 25 moves into registration with the opening 14 a seed or seeds 27, depending upon the size of the opening 25, will lodge in said opening. Thereafter, the opening 25 will move beneath the end wall 10 and then beyond the contiguous end of the bottom 18, as the bar 21 and block 22 reach their dotted line positions of Figure 3, so that the seed or seeds 27 will be discharged by gravity from the opening 25. Pressure is then released on the bar end to permit the tensioned elastic band 23 to rapidly return the bar and block to their full line positions of Figure 3. During this retracting movement the opening 25 passes so rapidly across the opening 14 that a seed will not lodge in the opening 25. It will also be apparent that movement of the bar across the opening 14 during the dispensing operation will gently agitate the seeds 27 to insure loading of the opening 25 so that a seed dispensing operation will be accomplished each time that the bar 21 is moved from right to left of Figures 1 to 3.

In actual assembly of the planter 6, the bar 21 is usually positioned against the bottom 12, after which the bottom channel member 17 is applied and the elastic band 23 is thereafter stretched around said channel member and the end wall 11.

All of the parts, with the exception of the elastic band 23, may be of molded plastic construction. It will also be apparent that the bottom channel member 17 could be molded integrally with the body member 7.

Various other modifications and changes are contemplated and may be resorted to, without departing from the function or scope of the invention as hereinafter defined by the appended claims.

I claim as my invention:

1. A portable seed planter comprising a body member including side walls, a first end wall and a second end wall and an inclined partition, said inclined partition having an upper end merging with said second end wall and a lower end terminating adjacent to but spaced from a lower end of the first end wall and combining therewith and with portions of the side walls to form a hopper outlet, said partition extending between the side walls and combining therewith and with said first end wall and a portion of the second end wall to form a hopper of which said hopper outlet forms a restricted outlet opening, said body member having an open top constituting the open top of the hopper, a removable closure for closing said open top, a bottom connected to and supported by the body member and disposed beneath and spaced from the lower ends of the end walls and partition and forming a through passage beneath said end walls and partition having open ends, said hopper outlet opening into an end portion of the passage, a valve including a bar extending longitudinally through and having a relatively snug fitting sliding engagement in said passage, said bar resting on and being disposed substantially parallel to the bottom and having an upstanding portion at one end thereof disposed beyond an end of the passage to abut against the outer side of the first end wall in a retracted position of the valve, the other end of said bar protruding from said passage beyond the second end wall when the valve is in a retracted position, an elastic member stretched around said second end wall and anchored to said bar portion for holding the valve in a retracted position, said bar having at least one seed receiving opening formed therein and disposed beneath the lower end of the partition in a retracted position of the valve for movement across the hopper outlet when a pressure is exerted against the last mentioned bar end, said seed opening being adapted to receive a seed charge from the hopper during movement of the opening beneath the hopper outlet and while the opening is closed from below by said bottom, said opening thereafter moving out of registration with the hopper outlet and beyond an end of said bottom for discharge of the seed charge by gravity therefrom, the valve being returned rapidly by said elastic member to a retracted position when pressure is released on the last mentioned bar end.

2. A planter as in claim 1, an elongated channel member including a bottom constituting said aforementioned bottom and upstanding substantially parallel side walls embracing portions of the side walls of the body member for frictionally supporting the channel member thereon with the bottom disposed beneath and spaced from the lower ends of the end walls and partition.

3. A portable seed planter comprising an elongated box having side walls, a first end wall and a second end wall, and a bottom, said planter box forming a seed hopper and having an open top through which the hopper is adapted to be filled with seeds, a removable closure for closing the open top of the hopper, said bottom terminating at a point spaced from the first end wall to form a hopper outlet, a channel member having spaced side walls embracing and frictionally engaging said planter box side walls and supported thereby on the planter box, said channel member having a bottom disposed beneath and spaced from the planter box bottom, a valve bar extending longitudinally through and slidably supported in the channel member between the bottom thereof and said planter box bottom, said bar having an upstanding enlargement at one end thereof disposed beyond the first end wall and at least one seed receiving opening spaced from said upstanding enlargement and disposed beneath the bottom of the planter box, when the enlargement is in engagement with said first end wall, an endless elastic member disposed around said enlargement and around said second end wall under tension for holding the valve in a retracted position with the seed opening thereof disposed beneath the bottom of the planter box and with the other end of said bar extending outwardly from said second end wall, said valve being slidably movable longitudinally of the channel member by a pressure exerted on said last mentioned bar end for causing the seed opening to move into registration with the hopper outlet and to be charged with seed therefrom and to thereafter move out of registration with the hopper outlet and out of engagement with the channel member for discharging the seed by gravity, said valve being rapidly returned to a retracted position by the elastic member.

References Cited in the file of this patent

UNITED STATES PATENTS

| 923,837 | Hautsch | June 8, 1909 |
| 2,202,653 | Glidden | May 28, 1940 |
| 2,553,509 | Altorfer | May 15, 1951 |

FOREIGN PATENTS

| 927,337 | France | Oct. 27, 1947 |